C. H. HILL & A. W. PROCTOR.
Belt-Shifters.
No. 158,173. Patented Dec. 29, 1874.
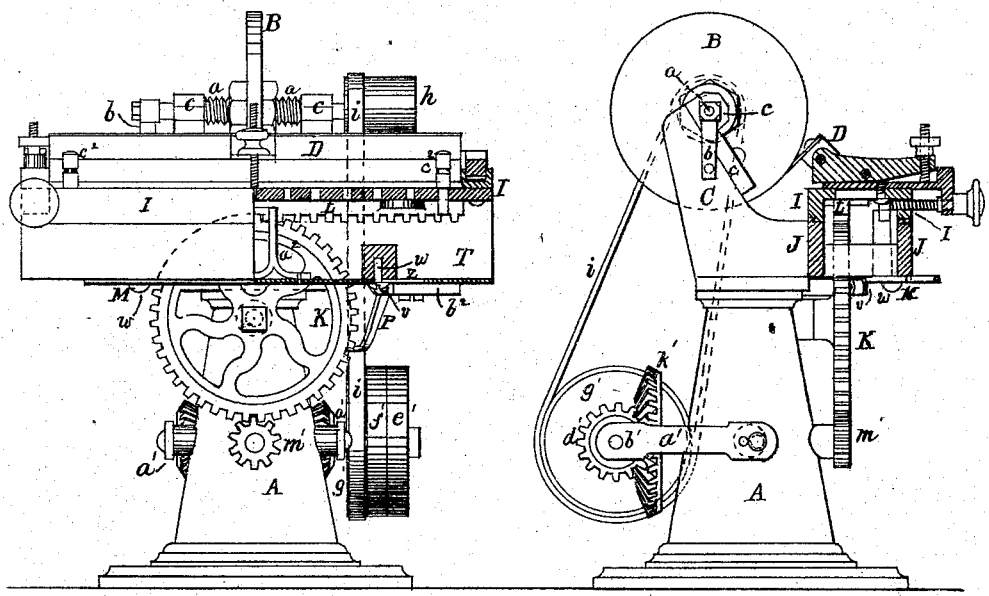
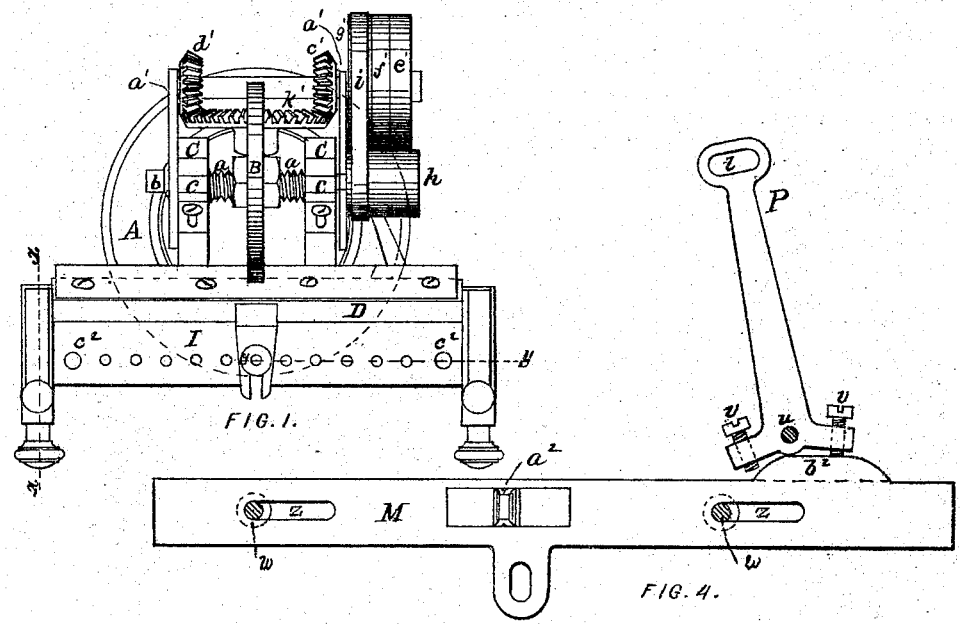
Witnesses.
W. P. Bee
Jos. C. Wildman
Inventors
Hill & Proctor,
By their Attorneys,
Stansbury & Munn

UNITED STATES PATENT OFFICE.

CHARLES H. HILL AND AMOS W. PROCTOR, OF BILLERICA, MASSACHUSETTS, ASSIGNORS TO UNION STONE COMPANY.

IMPROVEMENT IN BELT-SHIFTERS.

Specification forming part of Letters Patent No. 158,173, dated December 29, 1874; application filed November 13, 1874.

CASE B.

*To all whom it may concern:*

Be it known that we, CHARLES H. HILL and AMOS W. PROCTOR, of Billerica, in the State of Massachusetts, have invented an Improvement in Belt-Shifters, of which the following is a specification:

The invention has reference to that class of machinery in which there is employed a carriage or slide having a reciprocating motion; and consists in a contrivance by which the belt-guide, when thrown over to shift the belt from one position to another, is held locked in its extreme position.

We have applied the invention to the carriage of a knife-grinding machine, of which we proceed to give such a description as will enable others to fully understand our present invention and its mode of operation.

Figure 1 is a plan of a said knife-grinding machine. Fig. 2 is a front elevation of the same, a part taken on the line $y$ $y$ of Fig. 1 being in section. Fig. 3 is a side elevation, a part taken on the line $x$ $x$ of Fig. 1 being in section. Fig. 4 is a view in detail of the belt-shifting device.

A is the standard or pedestal of the machine. B is the grinding-wheel, fixed upon the main shaft $a$, which is revolved by a crank, $b$, or by power. The main shaft $a$ has adjustable bearings, which it is not necessary to describe otherwise than to say that they are supported by brackets C C upon the pedestal A. At the other extremities of the same brackets are ways J J, upon which the carriage I is supported and travels. The carriage I carries the knife-bar D, and by its movements forward and back presents the knife in grinding throughout its length to the wheel. Various screws and levers are shown in the drawings for determining the bevel to be given to the knife, which will not be here described, this invention having reference only to the movement of the carriage.

The carriage operates as follows: $a^1$ $a^1$ are two brackets attached to the pedestal, as shown, and furnishing bearings for a shaft, $b^1$, upon which are two bevel-gears, $c^1$ $d'$, the bevel-gear $c^1$ running loose upon the shaft $b^1$, while the bevel-gear $d'$ is fixed upon and revolves with the shaft. At one end of the shaft $b^1$ are three large pulleys, $e'$ $f''$ $g'$, the pulley $e'$ being fast, $f''$ being an ordinary loose pulley, and $g'$ being a loose pulley, but having its hub rigidly connected with the hub of the bevel-gear $c^1$. $h'$ is a pulley upon the main shaft. It is connected with one of the pulleys $e'$, $f''$, or $g'$, as the case may be, by the belt $i$. $k'$ is a bevel-gear, made fast to the shaft $l'$, passing through and having bearings in the standard. It carries at its other end a small pinion, $m'$, taking into the large pinion K, to operate the rack L attached to the carriage, as shown. The bevel-gear $k'$ meshes with the bevel-gears $c^1$ and $d'$.

It is obvious that when the belt $i$ connects the pulley $h'$ in motion upon the main shaft with the fast pulley $e'$, the shaft $b^1$ is revolved and with it the bevel-gear $d'$ turning the bevel-gear $k'$ in one direction, and that when the belt is shifted to the pulley $g'$, loose upon the shaft $b^1$, the bevel-gear $c^1$, also loose upon the shaft $b^1$, but fast to the pulley $g'$, will turn the bevel-gear $k'$ in the opposite direction. It follows that when the bevel-gear $k'$ is turned in one direction the carriage will go to the right, and when in the other to the left.

The motion of the carriage is reversed as follows: P is the belt-guide, the belt $i$ passing through a slot, $t$. The belt-guide is pivoted at $u$ to a cross-bar between the two ways J J, and has two short arms, in which are two adjustable pins, $v$ $v$, as shown. M is a sliding bar secured to one of the ways J by two set-screws, $w$ $w$, two slots, $z$ $z$, in the bar, permitting it to have a motion to the right or left for the length of the slots. $a^2$ is an arm projecting upward from the sliding bar M, and $b^2$ is a cam projecting inwardly from the sliding bar, and shaped as shown, so that as the bar is moved one way or the other the cam strikes one of the adjustable pins $v$ $v$, and swings the belt-guide P, and holds it locked until designedly released. The arms in which the pins $v$ $v$ are inserted may be so shaped as not to require the pin.

In the carriage is a series of holes (shown in plan in Fig. 1 and in section in Fig. 2) and $c^2$ $c^2$ are two pins, which are dropped into these holes, and which are long enough to strike the arm $a^2$ as the carriage passes over the arm. The carriage moving, say, from left to right, one of the pins $c^2$ strikes the arm $a^2$, and carries with it the bar M a distance equal to the length of the slots $z$ $z$, and this causes the cam $b^2$ to swing the belt-guide P, thereby shifting the belt $i$ from the pulley $e'$ to $g'$, and, as before described, reversing the motion of the carriage. The movement of the carriage is now to the left until the other pin $c^2$ strikes the arm $a^2$, when the motion is reversed, as before.

The sliding bar M is shown with a handle, by which it may be moved without the aid of the pins $c^2$.

We claim—

The sliding bar M, constructed, operated, and locked in the manner described, and provided with the projecting cam $b^2$, in combination with the belt-guide P, vibrating on pivot $u$, and provided with the adjustable screw-pins $v$ $v$, all constructed and operating in the manner and for the purpose set forth.

CHAS. H. HILL.
A. W. PROCTOR.

Witnesses:
CHAS. F. ABBOTT,
C. H. STINCHFIELD.